United States Patent [19]

Iikura

[11] Patent Number: 5,630,340
[45] Date of Patent: May 20, 1997

[54] CONNECTING ROD FOR ENGINE

[75] Inventor: Masahiko Iikura, Iwata, Japan

[73] Assignee: Yamaha Hatsudoki Kabushiki Kaisha, Iwata, Japan

[21] Appl. No.: 311,382

[22] Filed: Sep. 23, 1994

[51] Int. Cl.⁶ ........................................ F16C 7/02
[52] U.S. Cl. .................... 74/579 E; 74/595; 123/197.3
[58] Field of Search ........................... 74/579 E, 595, 74/596, 597, 598; 123/197.3, 197.4

[56] References Cited

U.S. PATENT DOCUMENTS

| 4,085,628 | 4/1978 | McWhorter | 123/197.3 X |
| 4,765,292 | 8/1988 | Morgado | 123/197.3 X |

FOREIGN PATENT DOCUMENTS 4 025 927   2/1992   Germany ........................ 123/197.4

*Primary Examiner*—Rodney H. Bonck
*Assistant Examiner*—Mary Ann Battista
*Attorney, Agent, or Firm*—Knobbe, Martens, Olson & Bear LLP

[57]   ABSTRACT

A split big end arrangement for the connecting rod of a reciprocating machine wherein the connecting rod's center of gravity is offset from a plane perpendicular to a plane containing the axes of the bearing portions of the connecting rod and passing through the center of the small bearing end. The threaded fasteners holding the halves of the connecting rod together lie in the plane with the center of gravity.

6 Claims, 3 Drawing Sheets

CONNECTING ROD FOR ENGINE

BACKGROUND OF THE INVENTION

This invention relates to a connecting rod and more particularly to an improved connecting rod arrangement that can be utilized with internal combustion engines or other similar reciprocating machines.

As is well known, reciprocating machines employ one or more pistons that are connected by means of connecting rods to a crankshaft for transmitting motion therebetween. If the mechanism operates as an engine, the piston drives the crankshaft through the connecting rod. If, on the other hand, the machine is a compressor, then the crankshaft drives the piston through the connecting rod. However, the construction of the connections between the piston, connecting rod, and crankshaft are generally the same.

In one typical connection type, the connecting rod has its small end formed with a bearing that receives a piston pin for providing the pivotal connection to the piston. The opposite or big end of the connecting rod has a crankshaft bearing that extends parallel to the piston pin bearing of the small end.

With many types of arrangements, the big end of the connecting rod is split into a main portion and a bearing cap portion that are affixed to each other by means of a pair of threaded fasteners. These threaded fasteners lie on an axis that defines a plane that extends perpendicularly to the plane of the axes of the bearing portions of the big and small ends.

Typically, the plane defined by the fasteners bisects the small end bearing. However, this type of arrangement provides certain disadvantages, particularly with connecting rod structures where the center of gravity of the connecting rod may not lie on the same plane as that which contains the axes of the threaded fasteners.

This type of arrangement can be understood by reference to FIG. 1, which is a side elevational view of a connecting rod, piston, crankshaft connection, and wherein the cylinder is shown partially in cross section and FIG. 2 which is a schematic partially schematic view showing the angular relationships of the cylinder bores of the cylinder block.

In FIG. 1 the reciprocating machine is of the type having a pair of angularly disposed cylinder banks the cylinder bores of which are shown schematically at 14a in FIG. 2. As is typical with this type of machine, be it an engine or a compressor, a crankshaft, indicated by the reference numeral 11, is provided with a single journal portion between a pair of cheeks 12 on which two connecting rods 13 are journaled in side-by-side fashion. The rotational axis 11a of the crankshaft is indicated in FIG. 2. Although the invention is described in conjunction with such a type of mechanism, it will be readily apparent to those skilled in the art that the inventive features can be used with engines having other cylinder configurations and in-line engines. Also, the invention is described in conjunction with only a single cylinder of the engine, but it will be apparent to those skilled in the art how it is employed with multiple cylinder machines.

The machine is provided with a cylinder block 14 in which a cylinder bore 15 is formed by a pressed or cast-in liner 16. A piston 17 is supported for reciprocation within the cylinder bore 15.

The connecting rod 13 has an upper or small end 18 that defines a piston pin bore which extends in a plane parallel to the plane of FIG. 1 and which receives a piston pin 19 that extends through a pair of pin bosses 21 of the piston 17 to provide a pivotal connection at this end. A pair of thrust washers 22 may be positioned between the sides of the small end 18 and the pin bosses 21.

The lower or big end of the connecting rod 13 is indicated generally by the reference numeral 23, and this is split into an upper portion 24 which is integral with the connecting rod portion 13 and a lower bearing cap portion 25. The portions 24 and 25 are detachably connected to each other in a suitable manner, and in the specific construction illustrated, a pair of socket headed screws 26 are threaded into tapped openings in the rod portion 24 and engage washers 27 for holding the cap 25 to the remainder of the connecting rod 13 and journaled on the throw of the crankshaft 11.

As is typical with the prior art type of construction, the axes of the fasteners 26 lie on a line or plane L, which plane passes generally through the center of the bearing surface of the small end 18. However, the construction generally employs a filleted end of both the bearing cap 25 and the corresponding rod portion 24 that is offset so as to provide a machined surface that can engage the throw 12. As a result, the center of gravity G of the connecting rod 18 lies on a plane M which is offset from the plane L by a dimension $\Delta X$.

This offsetting causes the loading on the fasteners 26 to be eccentric, and this can cause some problems. These problems are particularly acute when the reciprocating machine is a high speed machine, such as a high speed internal combustion engine.

It is, therefore, a principal object of this invention to provide an improved connecting rod structure for reciprocating machines.

It is a further object of this invention to provide an improved bearing arrangement for the split end of the big end of a connecting rod wherein uneven loadings on the fasteners are avoided.

SUMMARY OF THE INVENTION

This invention is adapted to be embodied in a connecting rod for a reciprocating machine for transmitting motion between a crankshaft and a piston. The connecting rod has a split big end which defines a crankshaft bearing. Fastening means connect the split ends together, and these comprise threaded fasteners that are disposed on opposite sides of the connecting rod. The small end of the connecting rod defines a bearing opening for connection to a piston, and the bearing opening and the crankshaft bearing define parallel axes that lie in a common plane. The center of gravity of the connecting rod is disposed at a point that is offset from a plane perpendicular to the plane in which the bearing axes lie from the center of the piston pin bearing. The threaded fastening means are disposed so that they lie in the same plane as the center of gravity.

DETAILED DESCRIPTION OF THE PREFERRED EMBODIMENT OF THE INVENTION

Figures 1, 2:
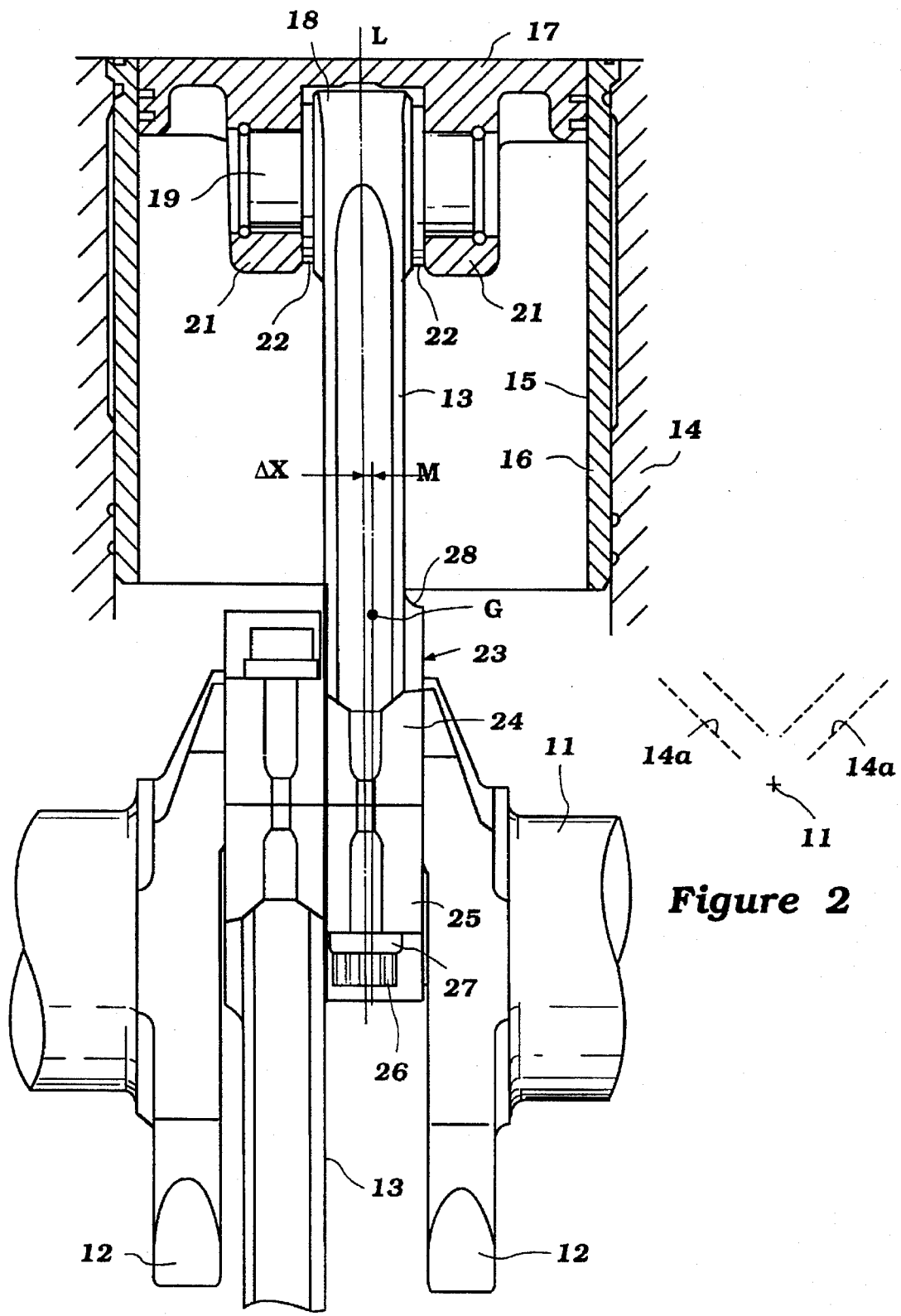
FIG. 1 is a side elevational view of a portion of a reciprocating machine constructed in accordance with the prior art, with the piston and cylinder being shown in cross section.
FIG. 2 is a view looking in the direction perpendicular to FIG. 1 and shows schematically the angular relationship of the cylinder bores in the cylinder block.
Figure 3:
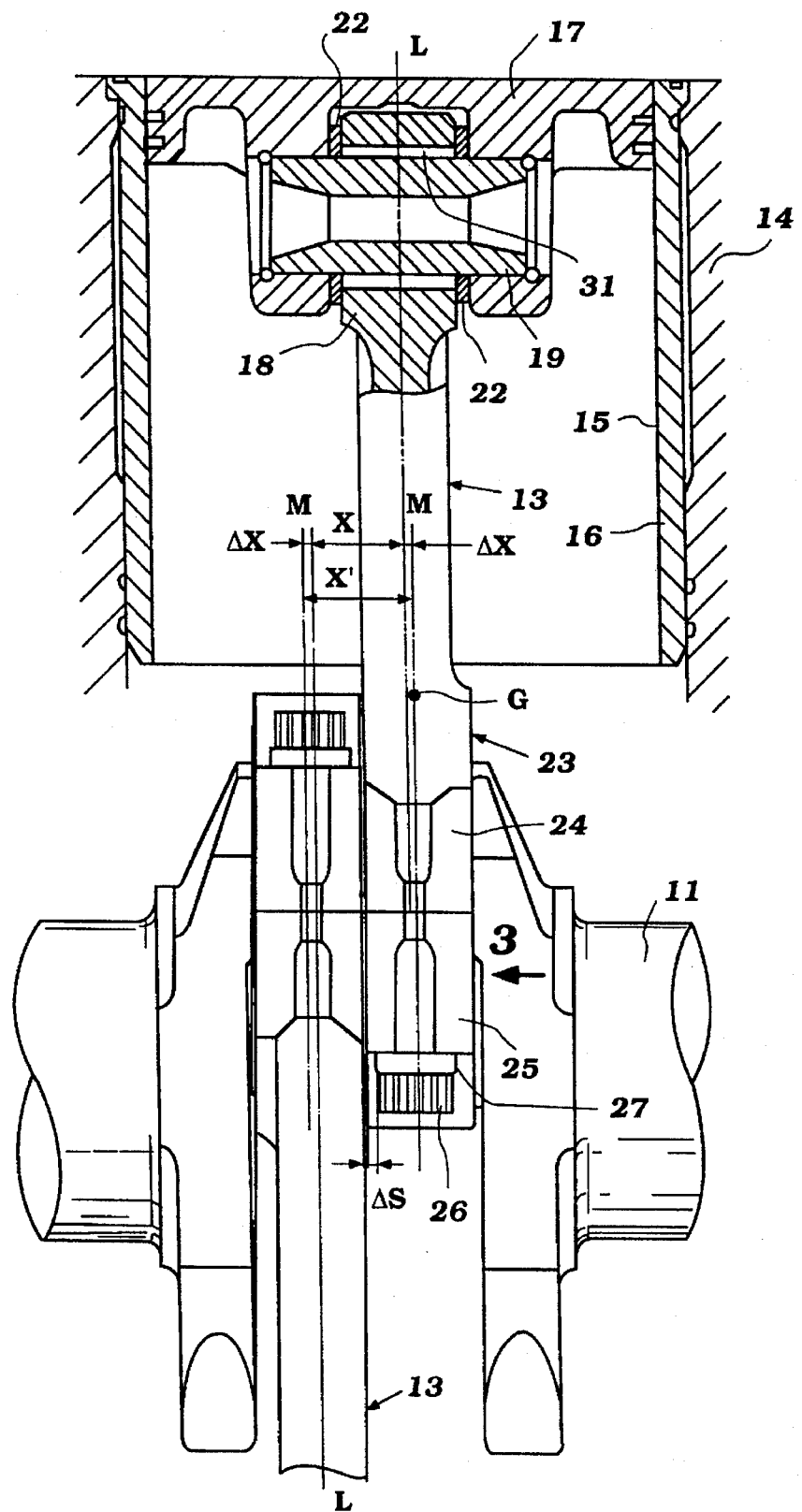
FIG. 3 is a side elevational view, in part similar to FIG. 1, and shows an embodiment of the invention.
Figure 4:
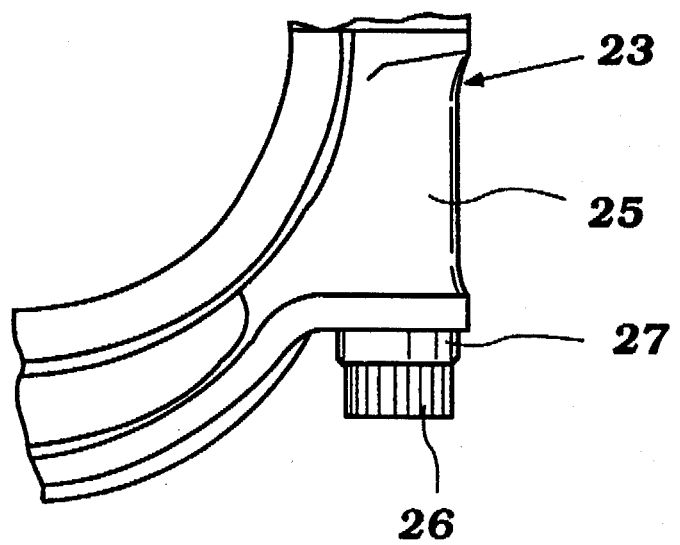
FIG. 4 is an enlarged and elevational view looking in the direction of the arrow 4 in FIG. 3.

The construction of the preferred embodiment will be described by reference to FIGS. 3 and 4, and since the components, except for certain facets of their orientation, are the same as those of the prior art construction already described, those components are identified by the same reference numerals and will not be described again. In this embodiment, the actual bearing in the connecting rod small end 18 that receives the piston pin 19 is illustrated and is identified by the reference numeral 31.

In this embodiment of the invention, the central axis of the threaded fasteners 26 is offset from the plane L and defines the plane M in which the center of gravity G is located. Hence, the center of the threaded fasteners 26 lie on a common plane with the center of gravity of the connecting rod 13, and thus a stronger construction will result.

In addition to obtaining this result, the head of the threaded fastener 26 is moved the distance $\Delta x$ away from the adjacent connecting rod on the same throw of the crankshaft 11, and thus there is a distance $\Delta S$ permitted on the peripheral edge of the threaded fastener 26 that permits it to be spaced further from the adjacent connecting rod to facilitate installation and removal.

As also may be seen in this figure, the distance X' between the centers of the threaded fasteners 26 of adjacent connecting rods 13 is greater than the distance X of the prior art type of constructions because the threaded fasteners associated with each connecting rod 26 are offset by the distance $\Delta x$. In other words, $X'=X+2\Delta x$. This also has the effect of spreading the clamping or bearing forces on the crankshaft throw further from each other.

It should be apparent from the foregoing description that the described embodiment of the invention provides a stronger connection between the split halves of a connecting rod than the prior art type of construction. Of course, the foregoing description is that of a preferred embodiment of the invention, and various changes and modifications may be made without departing from the spirit and scope of the invention as defined by the appended claims.

What is claimed is:

1. A reciprocating machine comprising a cylinder block having at least one cylinder bore formed therein, a piston reciprocating in said cylinder bore, a crankshaft journaled for rotation about a first axis relative to said cylinder block, a connecting rod for transmitting reciprocation of said piston into rotation of said crankshaft about said first axis, said connecting rod having a small end defining a cylindrical bearing opening having an axis for receiving a piston pin, means for coupling said piston pin to said piston for transmitting motion from said piston to said connecting rod, the other end of said connecting rod comprising a big end split into two pieces defining a cylindrical crankshaft bearing opening having an axis that extends parallel to said first axis and which axis is parallel to the axis of said cylindrical bearing opening of said small end of said connecting rod and is in a common plane therewith, at least two threaded fasteners being disposed on opposite sides of said connecting rod for fixing said two pieces of said big end together in embracing relationship with a throw of said crankshaft, the center of gravity of said connecting rod being offset from a first plane perpendicular to said common plane and passing through an axial center of said crankshaft bearing opening, said at least two threaded fasteners having axes lying on a plane containing the said center of gravity and extending parallel to said first plane.

2. A reciprocating machine as in claim 1 wherein the cylinder block has a second cylinder bore disposed at an angle to the first mentioned cylinder bore and containing a second piston, a second piston pin and second connecting rod connecting said second piston to the same throw of said crankshaft as the first mentioned piston, said second piston having a small end with a cylindrical bearing opening for receiving said second piston pin and coupling means for coupling said second piston pin to said second piston, said second connecting rod having a big end split into two pieces defining a cylindrical crankshaft bearing opening, and second fastening means for connecting said two pieces of said split end of said second connecting rod together in journaled relationship on said same crankshaft throw, said second fastening means comprising at least two threaded fasteners disposed on opposite sides of said second connecting rod, the center of gravity of said second connecting rod being offset from a plane perpendicular to a common plane containing the axes of said cylindrical bearing opening and said crankshaft bearing opening of said second connecting rod and passing through the center of said second connecting rod crankshaft bearing opening, the said at least two threaded fasteners of said second fastening means having axes lying on a plane containing the center of gravity of said second connecting rod.

3. A reciprocating machine as in claim 2, wherein the centers of gravity of the connecting rods are offset away from each other so as to increase the distance between the planes containing the threaded fasteners of the respective connecting rods.

4. A reciprocating in claim 1, wherein the reciprocating machine comprises an internal combustion engine.

5. A reciprocating machine as set forth in claim 4, wherein the cylinder block has a second cylinder bore disposed at an angle to the first mentioned cylinder bore and containing a second piston, a second piston pin and second connecting rod connecting said second piston to the same throw of said crankshaft as the first mentioned piston, said second piston having a small end with a cylindrical bearing opening for receiving said second piston pin and coupling means for coupling said second piston pin to said second piston, said second connecting rod having a big end split into two pieces defining a cylindrical crankshaft bearing opening, and second fastening means for connecting said two pieces of said split end of said second connecting rod together in journaled relationship on said same crankshaft throw, said second fastening means comprising at least two threaded fasteners disposed on opposite sides of said second connecting rod, the center of gravity of said second connecting rod being offset from a plane perpendicular to a common plane containing the axes of said cylindrical bearing opening and said crankshaft bearing opening of said second connecting rod and passing through the center of said second connecting rod crankshaft bearing opening, the said at least two threaded fastening fasteners of said second means having axes lying on a plane containing the center of gravity of said second connecting rod.

6. A reciprocating machine as in claim 5, wherein the centers of gravity of the connecting rods are offset away from each other so as to increase the distance between the planes containing the threaded fasteners of the respective connecting rods.

* * * * *